(12) United States Patent
Asamizu

(10) Patent No.: US 11,092,835 B2
(45) Date of Patent: Aug. 17, 2021

(54) DISPLAY APPARATUS HAVING LIGHT GUIDE MEMBER WITH TAPERED OPTICAL FIBERS

(71) Applicant: SAKAI DISPLAY PRODUCTS CORPORATION, Sakai (JP)

(72) Inventor: Tomohiro Asamizu, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 0 days.

(21) Appl. No.: 16/706,598

(22) Filed: Dec. 6, 2019

(65) Prior Publication Data

US 2020/0301184 A1  Sep. 24, 2020

Related U.S. Application Data

(60) Provisional application No. 62/821,224, filed on Mar. 20, 2019.

(51) Int. Cl.
| | |
|---|---|
| *G02B 6/06* | (2006.01) |
| *G02F 1/1333* | (2006.01) |
| *F21V 8/00* | (2006.01) |
| *G02F 1/13357* | (2006.01) |

(52) U.S. Cl.
CPC ....... *G02F 1/13336* (2013.01); *G02B 6/0028* (2013.01); *G02B 6/0061* (2013.01); *G02B 6/0068* (2013.01); *G02F 1/133615* (2013.01)

(58) Field of Classification Search
CPC  F21V 2200/13; G02B 6/0078; G02F 1/13336
See application file for complete search history.

(56) References Cited

U.S. PATENT DOCUMENTS

| | | | | |
|---|---|---|---|---|
| 4,299,447 | A  * | 11/1981 | Soltan | G09F 9/305 |
| | | | | 340/815.42 |
| 4,874,227 | A  * | 10/1989 | Matsukawa | G09F 9/35 |
| | | | | 349/73 |
| 5,465,315 | A  * | 11/1995 | Sakai | G09F 9/305 |
| | | | | 385/116 |
| 7,742,120 | B2 * | 6/2010 | Bayley | G03B 21/006 |
| | | | | 349/58 |
| 9,030,375 | B2 * | 5/2015 | Curtis | G02F 1/133606 |
| | | | | 345/1.1 |
| 9,274,369 | B1 * | 3/2016 | Lee | G02F 1/133524 |
| 9,366,812 | B2 * | 6/2016 | Chen | G02B 6/06 |
| 9,435,939 | B2 * | 9/2016 | Yang | G02B 6/0078 |
| 9,477,112 | B2 * | 10/2016 | Wu | G02B 6/0061 |

(Continued)

FOREIGN PATENT DOCUMENTS

JP  2012-108270 A  6/2012

*Primary Examiner* — Ismael Negron
(74) *Attorney, Agent, or Firm* — ScienBiziP, P.C.

(57) ABSTRACT

A light guide member has a plurality of optical fibers extending from a light receiving surface to a light emitting surface, and an extension part formed on the light emitting surface extending laterally, with respect to the light receiving surface, in a width direction. At least one part of the plurality of optical fibers is configured that the dimension of each optical fiber in the width direction is greater on the light emitting surface than the light receiving surface. The light guide member is configured to be provided on the outer periphery of at least two adjacent display panels to reduce non-display areas of a multi-display arrangement.

13 Claims, 12 Drawing Sheets

(56) References Cited

U.S. PATENT DOCUMENTS

| | | | | |
|---|---|---|---|---|
| 10,120,233 B2* | 11/2018 | Yang | .................. | G02B 6/06 |
| 10,564,914 B2* | 2/2020 | Chin | .................. | G02F 1/13336 |
| 2002/0097978 A1* | 7/2002 | Lowry | .................. | G09G 3/002 |
| | | | | 385/147 |
| 2005/0140613 A1* | 6/2005 | Lowe | .................. | G09F 13/0409 |
| | | | | 345/87 |

* cited by examiner

DISPLAY APPARATUS HAVING LIGHT GUIDE MEMBER WITH TAPERED OPTICAL FIBERS

CROSS-REFERENCE TO RELATED APPLICATIONS

This application claims priority to and the benefit of priority of U.S. Provisional Application No. 62/821,224, filed on Mar. 20, 2019, the entire contents of which are incorporated herein by reference.

BACKGROUND

Technical Field

The present disclosure relates to a light guide member and a multi display apparatus having the light guide member.

Description of Related Art

A multi display apparatus including a plurality of display devices arranged adjacent to each other in the vertical direction and/or the horizontal direction to configure a single large screen is known. In such a multi display apparatus, a screen signal representing a divided part of one image is transmitted to each display device configuring the multi display apparatus. A segmental image corresponding to the divided screen signal is displayed on each display device of display apparatus. As a result, one large image is displayed on the entire screen of the multi display apparatus.

Each display device configuring such a multi display apparatus has a frame. Therefore, a non-display portion (joint) in which no image is displayed due to the frame is formed in a boundary region between two neighboring display devices. Accordingly, linear non-display portions are generated in one large image displayed by the multi display apparatus, and the display quality of the multi display apparatus deteriorates.

In order to eliminate such a non-display portion, JP 2012-108270 A discloses a multi display apparatus that includes, in the non-display portion, a reflection member having a reflection surface that reflects light emitted from a display region.

SUMMARY

However, according to the multi display apparatus using the reflection member disclosed in JP 2012-108270 A, although the frame is concealed by the reflection member, an image visually recognized via the reflection member is merely a reflection of an image in a neighboring display region. Therefore, the image of a portion corresponding to the frame may be greatly different from the original image, and the display quality deteriorates correspondingly.

A light guide member according to an exemplary embodiment of the present disclosure is a light guide member to be attached to a multi display apparatus in which at least two display devices having a display panel and a frame provided on an outer periphery of the display panel are arranged adjacent to each other, wherein the light guide member has an elongated body extending along the frame, in a boundary region where the at least two display devices are neighboring, the light guide member includes a light receiving surface to be faced with a peripheral portion of a display surface of the display panel along the frame, the light receiving surface receiving light emitted from the display surface of the display panel, a light emitting surface separated from the light receiving surface in a direction perpendicular to the light receiving surface, the light emitting surface emitting the light entered from the light receiving surface into the light guide member, and a plurality of optical fibers extending from the light receiving surface to the light emitting surface, the light emitting surface has an extension part for covering the frame at least partly, the extension part extending toward the frame, with respect to the light receiving surface, in a width direction perpendicular to a longitudinal direction of the light guide member and perpendicular to a separation direction in which the light receiving surface and the light emitting surface are separated, and at least a part of the plurality of optical fibers is configured that the dimension of each optical fiber in the width direction is greater on the light emitting surface than on the light receiving surface, so that an image displayed on the light emitting surface is enlarged in the width direction compared to an image displayed on the display surface facing the light receiving surface.

A multi display apparatus according to an exemplary embodiment of the present disclosure is a multi display apparatus having at least two display devices having a display panel and a frame provided on an outer periphery of the display panel and arranged adjacent to each other, and a light guide member having an elongated body extending along the frame and attached to a display surface of the display panel in a boundary region where the at least two display devices are neighboring, wherein the light guide member includes a light receiving surface to be faced with a peripheral portion of the display surface of the display panel along the frame, the light receiving surface receiving light emitted from the display surface of the display panel, a light emitting surface separated from the light receiving surface in a direction perpendicular to the light receiving surface, the light emitting surface emitting the light entered from the light receiving surface into the light guide member, and a plurality of optical fibers extending from the light receiving surface to the light emitting surface, wherein the light emitting surface has an extension part for covering the frame at least partly, the extension part extending toward the frame, with respect to the light receiving surface, in a width direction perpendicular to a longitudinal direction of the light guide member and perpendicular to a separation direction in which the light receiving surface and the light emitting surface are separated, and at least a part of the plurality of optical fibers is configured that the dimension of each optical fiber in the width direction is greater on the light emitting surface than on the light receiving surface, so that an image displayed on the light emitting surface is enlarged in the width direction compared to an image displayed on the display surface facing the light receiving surface.

According to the light guide member and the multi display apparatus embodied in the present disclosure, when the light guide member is attached to the multi display apparatus along the frame of a display device, an image of the peripheral portion of the frame is enlarged in the width direction on the light emitting surface and displayed above the frame. Therefore, an image is displayed on a frame portion that is a joint where no image was displayed in a conventional multi display apparatus. In the multi display apparatus, the joint portion can be eliminated or reduced, and the display quality of the multi display apparatus can be improved. Further, since the image on the light emitting surface is an image obtained by enlarging an image displayed on the peripheral portion of the frame at least in the width direction, an image that is very close to an image that should be originally displayed can be displayed.

DETAILED DESCRIPTION

First Exemplary Embodiment

Hereinafter, a light guide member and a multi display apparatus according to an exemplary embodiment of the present invention will be described with reference to attached drawings. The light guide member and the multi display apparatus according to the present invention are not limited to the following exemplary embodiment.

Figure 1:
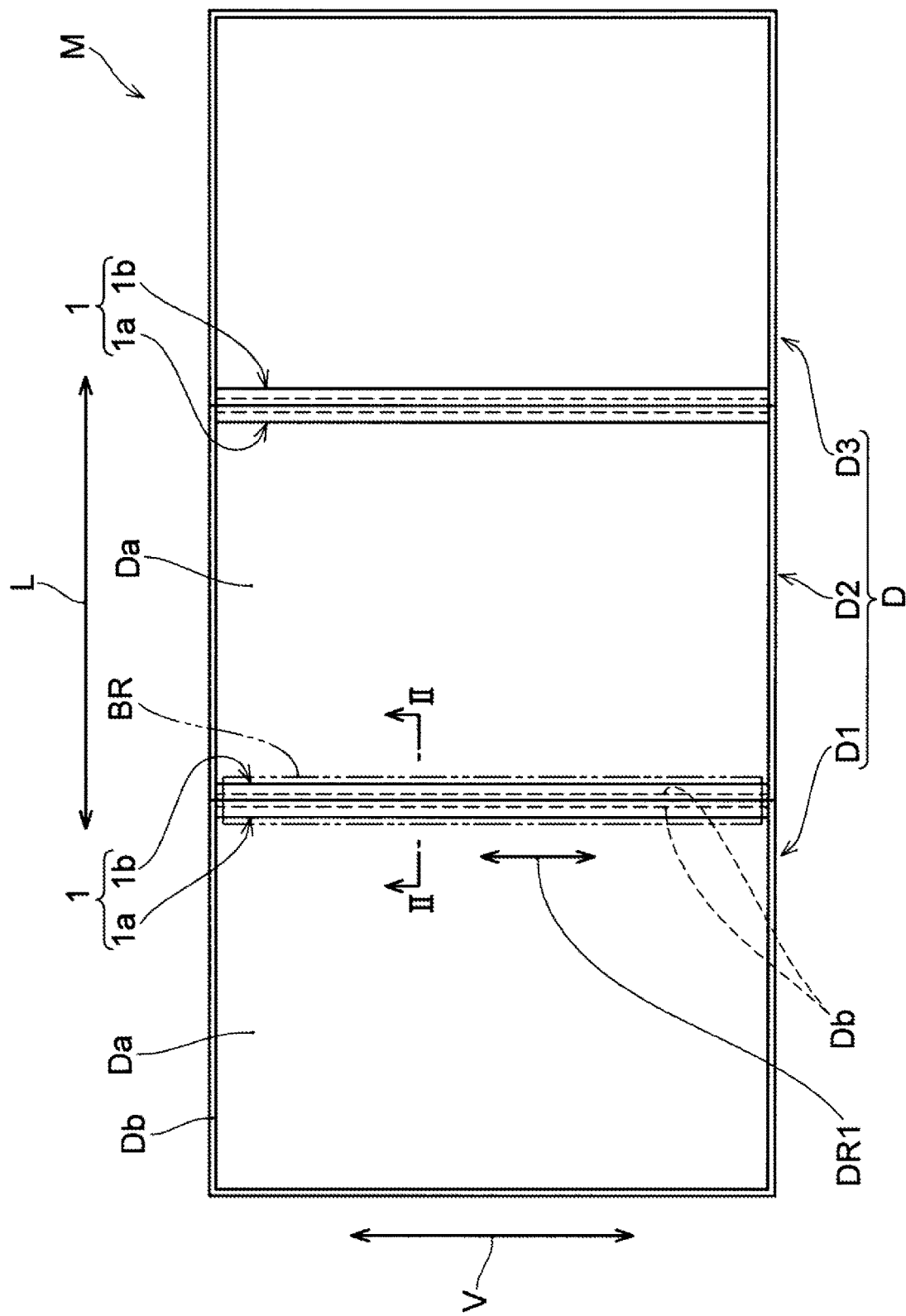
FIG. 1 is a front view illustrating a multi display apparatus to which light guide members according to an exemplary embodiment of the present invention are attached.
Figure 2:
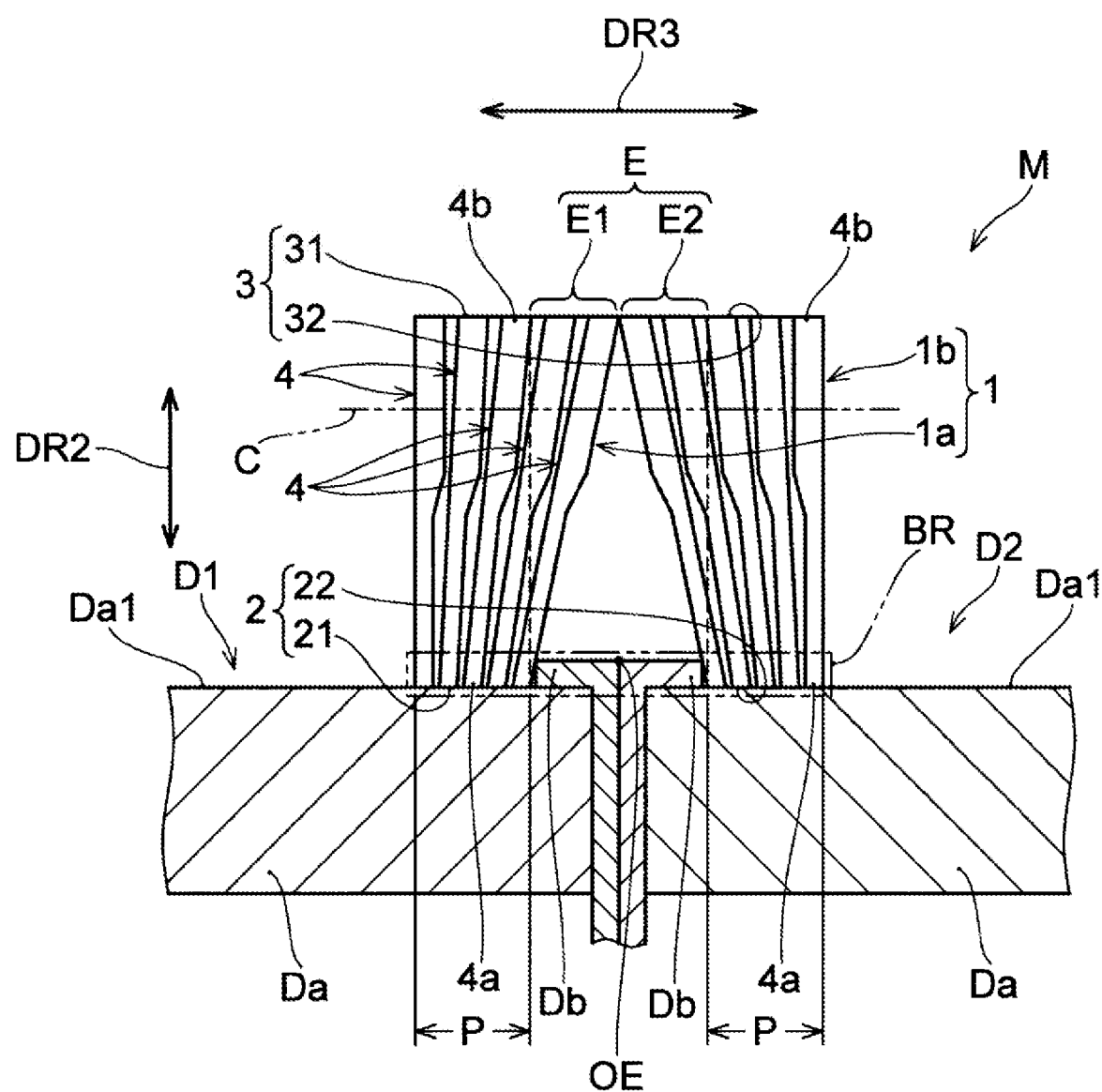
FIG. 2 is a schematic cross-sectional view taken along a line II-II in FIG. 1.
Figure 3:
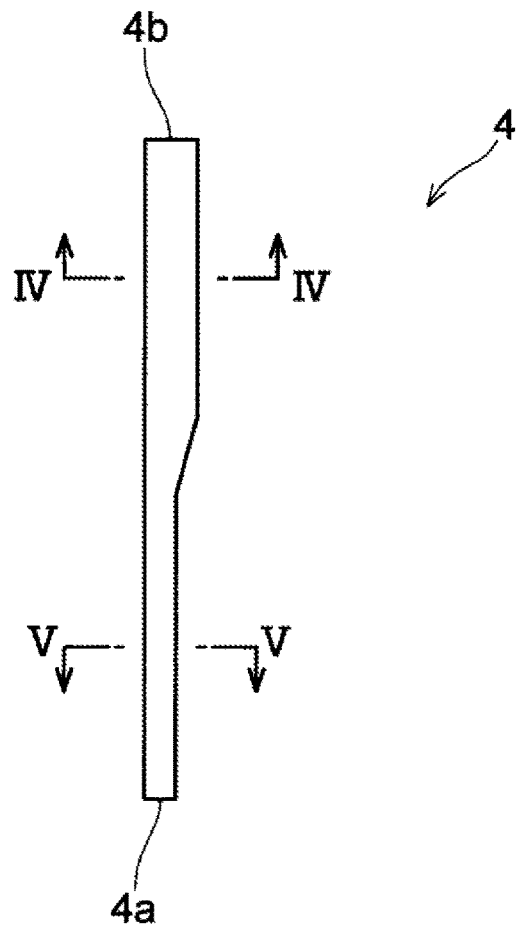
FIG. 3 is a side view schematically illustrating an optical fiber provided in the light guide member.
Figure 4:
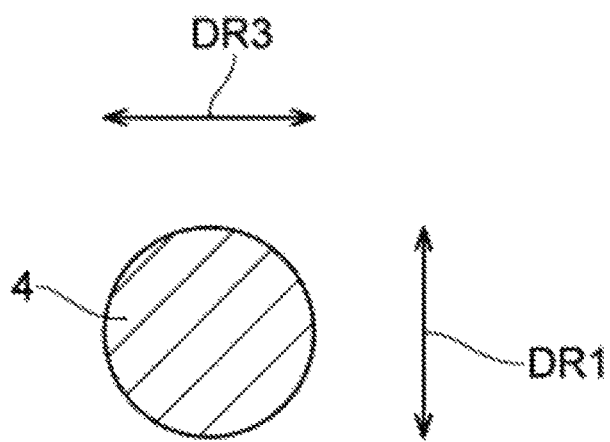
FIG. 4 is a cross-sectional view taken along a line IV-IV in FIG. 3.
Figure 5:
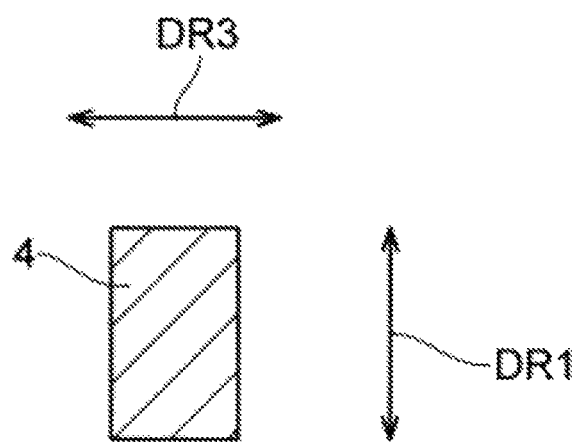
FIG. 5 is a cross-sectional view taken along a line V-V in FIG. 3.
Figure 6:
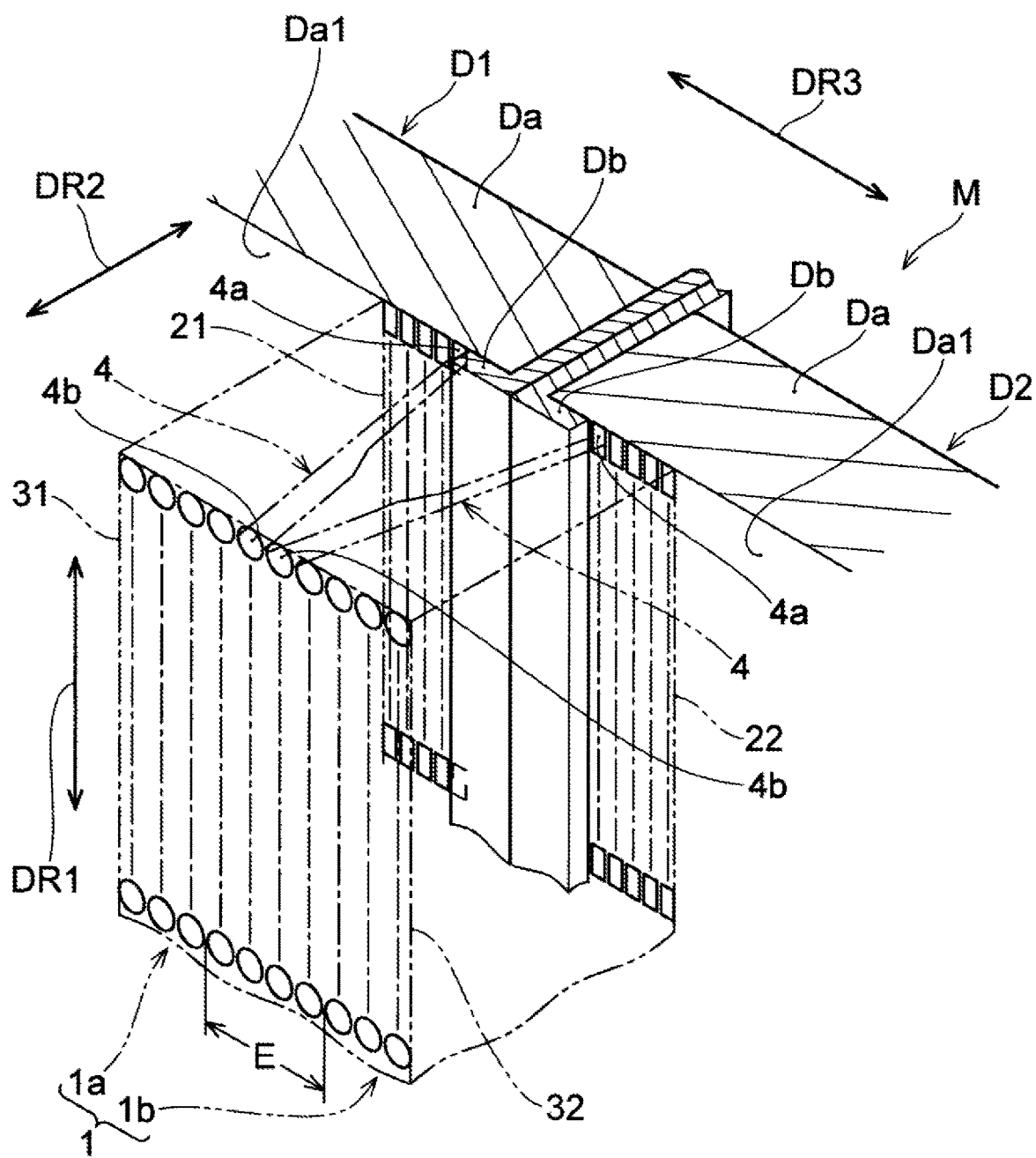
FIG. 6 is a perspective view schematically illustrating a light receiving surface and a light emitting surface of the light guide member.

FIG. 1 is a front view illustrating a multi display apparatus to which light guide members according to an exemplary embodiment of the present invention are attached. FIG. 2 is a schematic cross-sectional view taken along a line II-II in FIG. 1. FIG. 3 is a side view schematically illustrating an optical fiber provided in the light guide member. FIG. 4 is a cross-sectional view taken along a line IV-IV in FIG. 3, and FIG. 5 is a cross-sectional view taken along a line V-V in FIG. 3. FIG. 6 is a perspective view schematically illustrating a light receiving surface and a light emitting surface of the light guide member.

As illustrated in FIG. 1, a multi display apparatus M according to the present exemplary embodiment includes at least two (three in FIG. 1) display devices D and light guide members 1. The multi display apparatus M includes at least two display devices D each having a display panel Da and a frame Db provided on the outer periphery of the display panel Da. The multi display apparatus IM is configured by arranging a plurality of these display devices D in a vertical direction V and/or a horizontal direction L. Each display device D is configured in such a way as to display a segmental image obtained by dividing one image so that the multi display apparatus M as a combination of at least two display devices D can display one image.

In the present exemplary embodiment, as illustrated in FIG. 1, the multi display apparatus M is provided with three display devices D (first display device D1, second display device D2, and third display device D3) in the horizontal direction L and only one display device D in the vertical direction V. However, the display devices D configuring the multi display apparatus M are not particularly limited in total number and arrangement. The multi display apparatus M, as described below, may include a plurality of display devices D arranged in both of the vertical direction V and the horizontal direction L to form a matrix pattern, or may include display devices D arrayed in a line in the vertical direction V or the horizontal direction L.

The structure of the display device D is not particularly limited as long as the display device D has the display panel Da and the frame Db. In the present exemplary embodiment, the display device D is a liquid crystal display device having a liquid crystal panel and includes the display panel Da being the liquid crystal panel, the frame Db being a bezel, a backlight unit (not illustrated) provided behind the display panel Da, and a plurality of optical members (not illustrated) provided between the display panel Da and the backlight unit. The display device D is not limited to the liquid crystal display device, and may be an organic EL display device or may be a plasma display device.

As illustrated in FIG. 2, the display panel Da has a display surface Da1 on which an image can be displayed. The display surface Da1 used herein is a region of the front surface of the display panel Da inside the frame Db where the image can be visually recognized from outside. Further, a peripheral portion P of the display panel Da is a peripheral region of the display surface Da1 where the image can be visually recognized from outside, that is, a predetermined region neighboring the frame Db of the display surface Da1, inside the frame Db. In the present exemplary embodiment, as illustrated in FIG. 1, each display panel Da has a rectangular shape, and the multi display apparatus M configured by a plurality of display panels Da has a rectangular shape correspondingly. However, the display panels Da and the multi display apparatus M are not limited to rectangle in their shapes.

As illustrated in FIG. 1 the frame Db is provided on the outer periphery of the display panel Da to form a frame shape. The frame Db s covers the outer periphery of the front surface of the display panel Da and defines the display surface Da1 of the display panel Da. Although the frame Db is not particularly limited in shape, it is formed to have a rectangular frame shape in the present exemplary embodiment.

To configure the multi display apparatus M, the frames Db of at least two display devices D are arranged adjacent to each other and the display devices D are mutually connected by a predetermined connection method. As illustrated in FIG. 2, there is no clearance between the frame Db of the first display device D1 and the frame Db of the second display device D2 when they are connected. However, a clearance may be left between the frames Db of two neighboring display devices D. In the specification, a boundary region BR where the display devices D are adjacent to each other is a belt-like region including the frames Db of the neighboring display devices D and a region in the vicinity of the frames Db (see FIGS. 1 and 2).

As described below, the light guide member 1 is attached to the display panel Da in the boundary region BR where the display devices D are adjacent to each other, in order to suppress the display quality from being deteriorated by the frame Db when an image is displayed by the multi display apparatus M.

As illustrated in FIG. 1 the light guide member 1 has an elongated body extending along the frame Db in the boundary region BR where the display devices D are neighboring. The light guide member 1 is provided along the frame Db, in the multi display apparatus M, to make the joint inconspicuous. In the present exemplary embodiment, the light guide member 1 is provided along and correspondingly to each of the frames Db of two neighboring display devices D. Specifically, as illustrated in FIGS. 1 and 2, the light guide member 1 includes a first light guide member 1a attached along the frame Db of the first display device D1 and a second light guide member 1b attached along the frame Db of the second display device D2 neighboring the first display device D1, in the boundary region BR. Accordingly, the frame Db of the first display device D1 and the frame Db of the second display device D2 can be suppressed from being conspicuous as a joint.

In the present exemplary embodiment, each of the first light guide member 1a and the second light guide member 1b is an elongated body having a cross section of a substantial trapezoid, when being cut in a direction perpendicular to a longitudinal direction DR1 see FIG. 1, a direction parallel to the vertical direction V in the present exemplary embodiment). However, the first light guide member 1a and the second light guide member 1b are not limited in their shapes. For example, the first light guide member 1a and the second light guide member 1b can be formed as light guide members having a substantially rectangular cross-sectional shape in which a recess corresponding to the size of the frame Db is formed on a light receiving surface 2 side described below rectangular cross-sectional shape in which a notch having a size corresponding to the cross section of the frame Db is formed). Further, in the present exemplary embodiment, the first light guide member 1a and the second light guide 1b are the same in shape and size. However, the first light guide member 1a and the second light guide member 1b may be different in shape and size.

In the present exemplary embodiment, as illustrated in FIG. 2, the first light guide member 1a and the second light guide member 1b completely cover the frames Db in a thickness direction of the display panel Da (a separation direction DR2 described below). However, a clearance may be provided between the first light guide member 1a and the second light guide member 1b in a width direction DR3 described below. In the present exemplary embodiment, two light guide members (the first and second light guide members 1a and 1b) are provided along one boundary region BR. However, as described below, one light guide member may be provided in such a way as to straddle the frames Db in the boundary region BR as an exemplary embodiment. Further, in the present exemplary embodiment, the light guide member 1 has a length corresponding to the length of one side of the frame Db. However, the light guide member may be configured by a plurality of divided light guide members along one side of the frame Db.

The light guide member 1 is attached to the display surface Da1 of the display panel Da of the display device D. Specifically, as illustrated in FIG. 2, the light guide member 1 is attached to the peripheral portion P of the display surface Da1 inside the frame Db. Although the method for attaching the light guide member 1 to the display surface Da1 is not particularly limited, for example, an adhesive such as optical clear adhesive (OCA) or optical clear resin (OCR) can be used for bonding.

As illustrated in FIG. 2, the light guide member 1 includes the light receiving surface 2 and a light emitting surface 3. The light receiving surface 2 is faced with the peripheral portion P of the display surface Da1 of the display panel Da along the frame Db and receives light emitted from the display surface Da1 of the display panel Da. The light emitting surface 3 is separated from the light receiving surface 2 in a direction perpendicular to the light receiving surface 2 and emits the light entered from the light receiving surface 2 into the light guide member 1. Further, the light guide member 1 has a plurality of optical fibers 4 extending from the light receiving surface 2 toward the light emitting surface 3.

In the drawings, for convenience of explanation, the optical fibers 4 are illustrated to be thicker than the actual size and the number of the optical fibers 4 is reduced. The actual optical fibers 4 are thinner than the one illustrated in the drawings, and the number of the optical fibers 4 provided in the width direction DR3 and the longitudinal direction DR1 is larger than the number illustrated in the drawings. In the specification, a direction in which the light guide member 1 extends is referred to as the longitudinal direction DR1 of the light guide member 1 (see FIG. 1). In the present exemplary embodiment, the longitudinal direction DR1 is a direction parallel to an extending direction of the frame Db that extends in the boundary region BR to which the light guide member 1 is attached, and is a direction parallel to the vertical direction V in FIG. 1. Further, direction of the light guide member 1 in which the light receiving surface 2 and the light emitting surface 3 are separated is referred to as the separation direction DR2 (see FIG. 2). In the present exemplary embodiment, the separation direction DR2 is a same direction as the thickness direction of the display panel Da or a direction perpendicular to the display surface Da1 of the display panel Da. Further, direction perpendicular to the longitudinal direction DR1 and the separation direction DR2 is referred to as the width direction DR3 (see FIG. 2).

The light guide member 1 is an elongated body including the plurality of optical fibers 4 in a transparent resin. A resin material of the light guide member 1 in which the optical fibers 4 are provided is not particularly limited. However, it is preferable that the resin is transparent and has a lower refractive index. For example, an acrylic UV curable resin may be used.

The light receiving surface 2 is a portion to which light from the peripheral portion P of the display panel Da enters. In the present exemplary embodiment, the light receiving surface 2 is an elongate and substantially rectangular plane. A first end 4a of each of the plurality of optical fibers 4 is positioned on the light receiving surface 2 to take the light from the display surface Da1 into the optical fiber 4. The light receiving surface 2 is attached to the peripheral portion P of the display panel Da along the frame Db. In the present exemplary embodiment, a first light receiving surface 21 of the first light guide member 1a is attached to the peripheral portion P of the display surface Da1 of the first display device D1 along the inside of the frame Db of the first display device D1. Further, a second light receiving surface 22 of the second light guide member 1b is attached to the peripheral portion P of the display surface Da1 of the second display device D2 along the inside of the frame Db of the second display device D2.

The light emitting surface 3 is a surface that emits the light taken out from the optical fibers 4 at the light receiving surface 2. In the present exemplary embodiment, the light emitting surface 3 is an elongate and substantially rectangular plane. A second end 4b of each of the plurality of optical fibers 4 is positioned on the light emitting surface 3, so that the light taken into the optical fibers 4 from the display surface Da1 is emitted from the light emitting surface 3 of the light guide member 1. As a result, an image displayed on the display panel Da faced with the light receiving surface 2 can be displayed on the light emitting surface 3. In the present exemplary embodiment, the light entered from the first light receiving surface 21 of the first light guide member 1a is emitted from a first light surface 31 of the first light guide member 1a, and the light entered from the second light receiving surface 22 of the second light guide member 1b is emitted from a second light emitting surface 32 of the second light guide member 1b. Thus, as a continuous light emitting surface, the first light emitting surface 31 and the second light emitting surface 32 display an image. In the present exemplary embodiment, the light emitting surface 3 is a surface parallel to the light receiving surface 2. The light emitting surface 3 may not be parallel to the light receiving surface 2.

The light emitting surface 3 has an extension part E for covering the frame Db at least partly and extends toward the frame Db in the width direction DR3, with respect to the light receiving surface 2. When the light guide member 1 is attached to the display surface Da1, as illustrated in FIG. 2, the extension part E extends in such a way as to protrude toward the frame Db with respect to the light receiving surface 2. When the light guide member 1 is attached to the display surface Da1, the extension part E is positioned apart from the frame Db in the separation direction DR2 and covers a part of the frame Db (in the present exemplary embodiment, covers the whole of the frame Db).

In the present exemplary embodiment, the first end 4a of the optical fiber 4 is positioned inside the frame Db on the light receiving surface 2, whereas the second end 4b of the optical fiber 4 extends on the light emitting surface 3 in such a way as to approach an outer edge OE of the frame Db in the width direction DR3 with respect to the first end 4a. The second end 4b is offset with respect to the first end 4a in the width direction DR3.

In the present exemplary embodiment, the extension part E is extended with a width corresponding to the width of the frame Db in the width direction DR3. That is, the light emitting surface 3 is extended in the width direction DR3 by the length of the width of the frame Db with respect to the light receiving surface 2. As a result, when the first light guide member 1a and the second light guide member 1b are attached to the display surface Da1, a first extension part E1 of the first light guide member 1a and a second extension part E2 of the second light guide member 1b completely cover the frames Db so as to prevent the frames Db from being seen from outside, thereby improving the display quality.

The optical fiber 4 extends from the light receiving surface 2 toward the light emitting surface 3 and transmits the light emitted from the peripheral portion P of the display panel Da to the light emitting surface 3. The optical fiber 4 has the first end 4a positioned on the light receiving surface 2 and the second end 4b positioned on the light emitting surface 3, and transmits the light emitted from the peripheral portion P of the display surface Da1 of the display panel Da from the first end 4a toward the second end 4b, thereby displaying an image on the light emitting surface 3. The plurality of optical fibers 4 is provided along the longitudinal direction DR1 and the width direction DR3 of the light guide member 1.

As illustrated in FIGS. 2 and 6, at least a part of the plurality of optical fibers 4 is configured in such a manner that the dimension of each optical fiber 4 in the width direction DR3 is greater on the light emitting surface 3 than that on the light receiving surface 2. As a result, the image displayed on the light emitting surface 3 via the optical fiber 4 is enlarged in the width direction DR3 with respect to the image displayed on the display surface Da1 facing the light receiving surface 2. In the present exemplary embodiment, the dimension of all optical fibers 4 in the width direction DR3 is greater on the light emitting surface 3 than on the light receiving surface 2. However, a part of the optical fibers 4 may have the same dimension in the width direction DR3 on the light receiving surface 2 and the light emitting surface 3.

Figure 7:
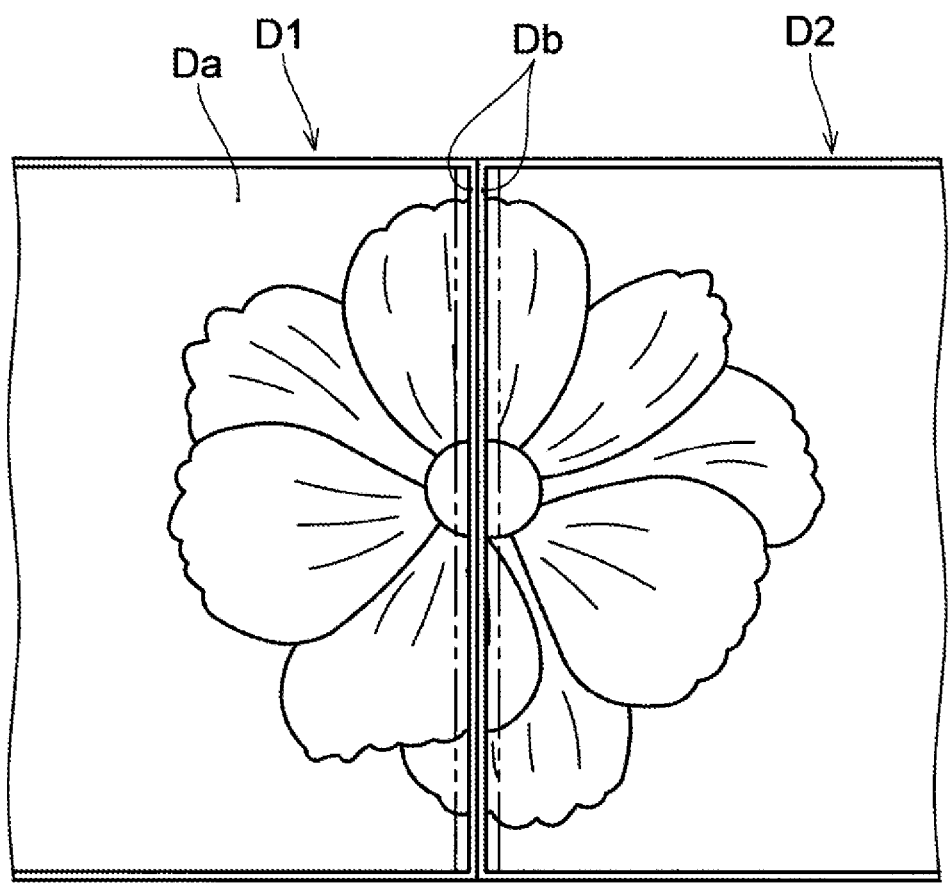
FIG. 7 is a diagram illustrating an image displayed by the multi display apparatus before the light guide members are attached.
Figure 8:
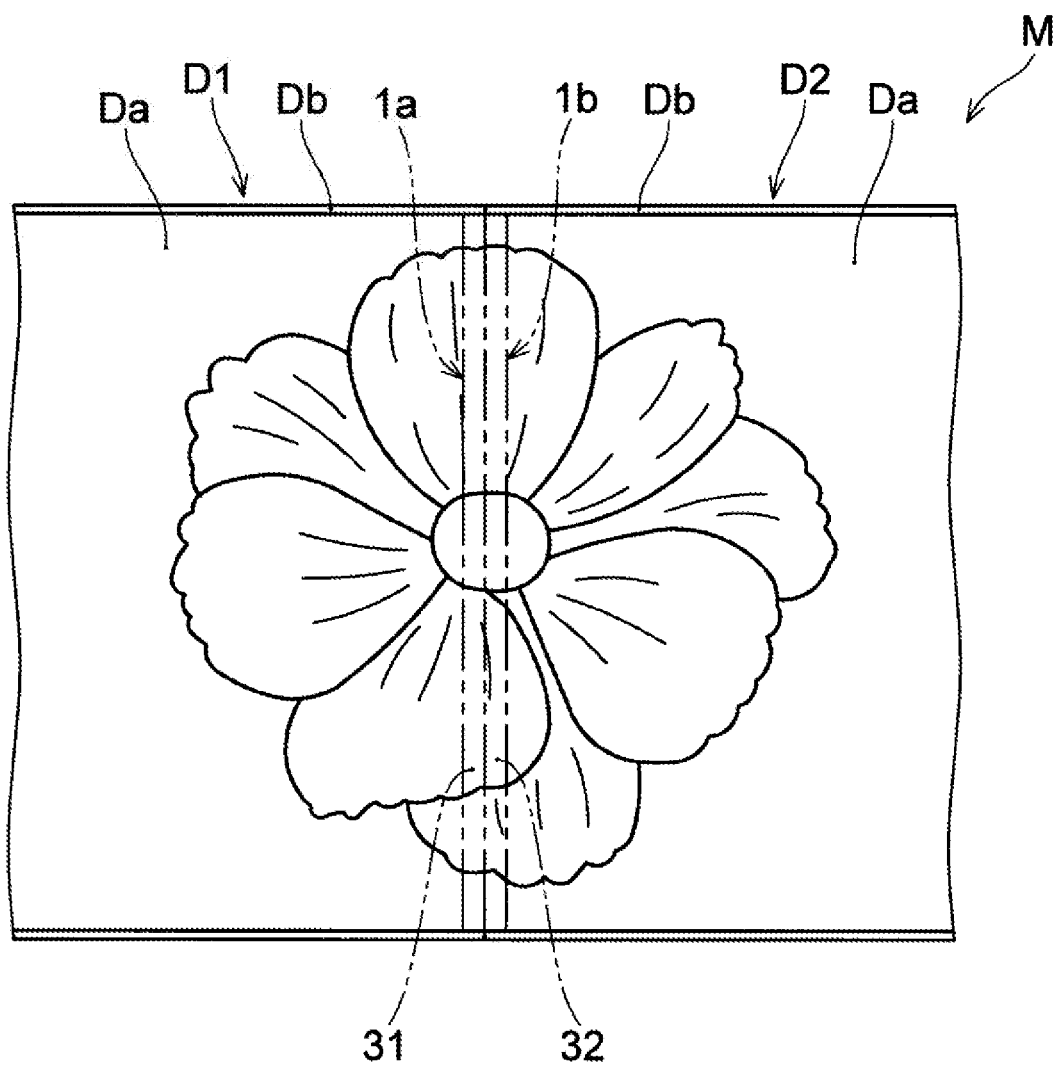
FIG. 8 is a diagram illustrating an image displayed by the multi display apparatus after the light guide members are attached.

As described above, the light guide member 1 is configured such that the light emitting surface 3 has the extension part E covering the frame Db at least partly and extending toward the frame Db, with respect to the light receiving surface 2, in the width direction DR3 and the dimension of each optical fiber 4 in the width direction DR3 is greater on the light emitting surface 3 than on the light receiving surface 2. Accordingly, when the light guide member 1 is attached to the multi display apparatus M along the frame Db of the display device D, the image of the peripheral portion P of the display surface Da1 is displayed in the extension part E positioned above the frame Db, as illustrated in FIGS. 2 and 6, while it is enlarged by the optical fiber 4 at a predetermined magnification in the width direction DR3, on the light emitting surface 3. Therefore, as illustrated in FIG. 8, an image can be displayed by the light guide member 1 at the place corresponding to the frame Db where no image was conventionally displayed as a joint in the boundary region BR of the display device D (see FIG. 7), and accordingly in the multi display apparatus M, the joint portion where no image is displayed can be eliminated or reduced. Accordingly, the display quality of the multi display apparatus M can be improved. Further, in FIG. 8, the image on the light emitting surface 3 indicated by two-dot chain lines is the one obtained by enlarging (extending) the image displayed between two-dot chain lines and the frame Db in FIG. 7 (corresponding to a region where the light receiving surface 2 abuts) at least in the width direction DR3. Therefore, unlike a reflected image or the like, an image that is very close to an image that should be originally displayed can be displayed.

In the present exemplary embodiment, as illustrated in FIG. 2, optical fiber 4 is configured such that the cross-sectional area of the optical fiber 4 increases from the light receiving surface 2 toward the light emitting surface 3 in at least a part of the region from the light receiving surface 2 toward the light emitting surface 3, and is inclined with respect to the separation direction DR2. In the present exemplary embodiment, a portion of the optical fiber 4 adjacent to the light receiving surface 2 is shorter in dimension in the width direction DR3 and smaller in cross-sectional area. On the other hand, a portion of the optical fiber 4 adjacent to the light emitting surface 3 is longer in dimension in the width direction DR3 and larger in cross-sectional area. In the present exemplary embodiment, the plurality of optical fibers 4 arrayed in the width direction DR3 is inclined in such a manner that the offset amount between the first end 4a and the second end 4b of the optical fiber 4 in the width direction DR3 increases when the optical fiber 4 is close to the frame Db in the width direction DR3 on the light receiving surface 2. As a result, as illustrated in FIGS. 2 and 6, the first ends 4a of the optical fibers 4 are densely arranged in the width direction DR3 on the light receiving surface 2, thereby preventing leakage of the light from each pixel of the display panel Da. And, an image widened in the width direction DR3 can be displayed on the light emitting surface 3. The optical fiber 4 may be curved and extended from the light receiving surface 2 toward the light emitting surface 3. In this case, the plurality of optical fibers 4 arrayed in the width direction DR3 mat be curved in such a manner that the offset amount between the first end 4a and the second end 4b of the optical fiber 4 in the width direction DR3 increases when the optical fiber 4 is close to the frame Db in the width direction DR3 on the light receiving surface 2.

The cross-sectional shape of the optical fiber 4 is not particularly limited. In the present exemplary embodiment, as illustrated in FIGS. 4 and 5, at least a part of the plurality of optical fibers 4 is formed to have a substantially rectangular cross section at a position separated from the light receiving surface 2 by a first distance, and a substantially circular cross section at a position separated from the light receiving surface 2 by a second distance larger than the first distance. More specifically, as illustrated in FIGS. 4 to 6, the cross section of the optical fiber 4 at the light receiving surface 2 is a substantially rectangle with the dimension in the longitudinal direction DR1 being greater than the dimension in the width direction DR3, and the dimension of the optical fiber 4 in the longitudinal direction DR1 at the light receiving surface 2 is substantially the same as the diameter of the substantially circular optical fiber 4 at the light emitting surface 3. Further, the dimension of the optical fiber 4 in the width direction DR3 at the light receiving surface 2 is shorter than the diameter of the substantially circular optical fiber 4 at the light emitting surface 3. As a result, as illustrated in FIG. 6, the image on the display surface Da1 is enlarged with the predetermined magnification at the light emitting surface 3 in the width direction DR3, via the optical fiber 4. The magnification of image in the width direction DR3 at the light emitting surface 3 can be changed by setting a desired ratio between the dimension of the second end 4b of the optical fiber 4 in the width direction DR3 and the dimension of the first end 4a in the width direction DR3. For example, the dimension of the second end 4b of the optical fiber 4 in the width direction DR3 can be set to be not less than 1.2 times and not greater than 2 times, preferably not less than 1.2 times and not greater than 1.5 times, the dimension of the first end 4a in the width direction DR3.

The light guide member 1 having the above-described structure can be manufactured, for example, by the following manufacturing method. Specifically, the method includes aligning the plurality of optical fibers 4 in parallel with each other to form a ribbon-shaped optical fiber bulk and subsequently compressing, from a side of the optical fiber 4, a part of the optical fiber 4 (a half of the optical fiber including the first end 4a) in the longitudinal direction (the extending direction of the optical fiber 4), thereby changing the cross-sectional area of the optical fiber 4 in the longitudinal direction. The method includes preparing a plurality of such ribbon-shaped optical fiber bulks that are compressed partly (by half) in the longitudinal direction, adding an ultraviolet curable resin to join the optical fiber bulks together, and irradiating the ribbon-shaped fiber bulks with the ultraviolet ray. By repeating the above-mentioned processes, as illustrated in FIGS. 2 and 6, light guide member 1 in which the plurality of optical fibers 4 is inclined and arrayed in the width direction DR3 can be obtained. The method further includes cutting the light guide member 1 to be shorter in the separation direction DR2 so as to change the dimensions of the light receiving surface 2 and the light emitting surface 3 in the width direction DR3 according to the width of the frame Db of the attached display device D. For example, in the case of setting the width of the frame Db to be shorter than the width illustrated in FIG. 2, the length of the light emitting surface 2 and the extension part E in the width direction. DR3 can be reduced by cutting the light guide member 1 along a line indicated by a two-dot chain line C in FIG. 2. As a result, it is easy to cope with differences in frame width of the display devices D. The above-described method for manufacturing the light guide member 1 is a mere example, and the light guide member 1 is not particularly limited in the manufacturing method.

Second Embodiment

Next, a light guide member and a multi display apparatus according to a second embodiment will be described. In the following description, features common to respective configurations of the first exemplary embodiment are not described redundantly, and mainly differences will be described. Respective configurations described in the first exemplary embodiment are also applicable to the light guide members and the multi display apparatus according to the second embodiment.

In the first exemplary embodiment, two light guide members, namely, first and second, light guide members 1a and 1b are configured to make the frame Db inconspicuous in the single boundary region BR. On the other hand, in the present exemplary embodiment, only one light guide member 1 is attached in such a way as to straddle the frames Db of two neighboring display devices D in the single boundary region BR.

Figure 9:
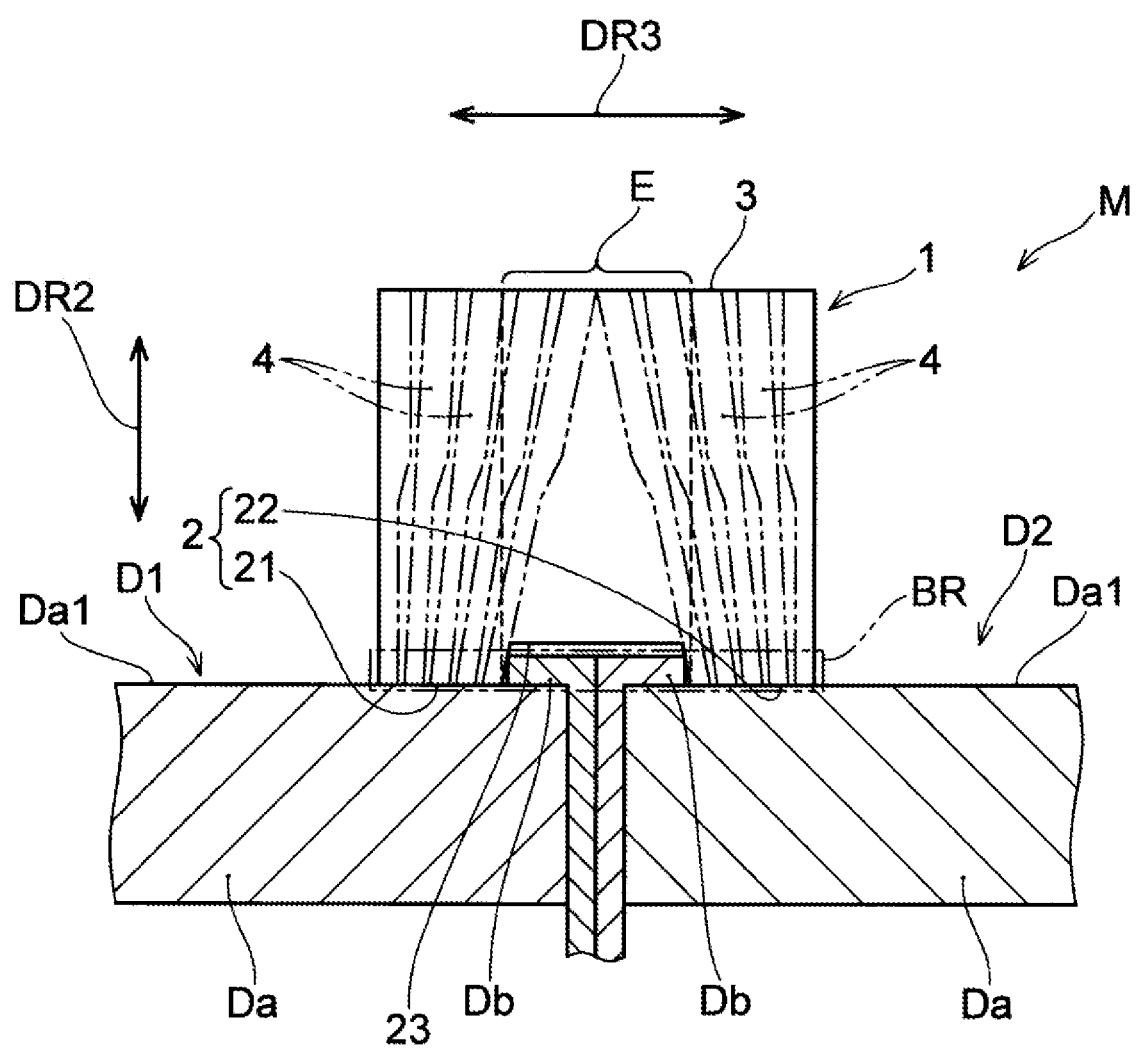
FIG. 9 is a cross-sectional view schematically illustrating a light guide member according to another exemplary embodiment of the present invention.

In the present exemplary embodiment, the light guide member 1 has a structure similar to a structure obtained by integrating the first light guide member 1a and the second light guide member 1b described in the first exemplary embodiment. Specifically, as illustrated in FIG. 9, the light receiving surface 2 has a first light receiving surface 21 and a second light receiving surface 22 that are separated in the width direction DR3. A recess 23 having a width sufficient for accommodating the frames Db of two adjacently arranged display devices D is formed between the first light receiving surface 21 and the second light receiving surface 22. As a result, the light entered from the first light receiving surface 21 and the second light receiving surface 22 can be emitted from the single light emitting surface 3 via the plurality of optical fibers 4.

In the present exemplary embodiment, in addition to the effects described in the first exemplary embodiment, it is only necessary to attach only one light guide member 1 in the boundary region BR, and therefore it is unnecessary to arrange two light guide members facing with each other. Therefore, the light guide member 1 can be easily attached to the display device D. Further, in the present exemplary embodiment, only one light emitting surface 3 is provided and the frame Db is completely covered by the light guide member 1. Therefore, the image on the light emitting surface 3 includes no joint. In the present exemplary embodiment, the extension part E of the light emitting surface 3 is a portion of the light emitting surface 3 corresponding to a region between the first light receiving surface 21 and the second light receiving surface 22 in the width direction DR3, that is, a portion that faces the frame Db in the separation direction DR2, as illustrated in FIG. 9.

Third Embodiment

Next, a light guide member and a multi display apparatus according to a third embodiment will be described. In the following description, features common to respective configurations of the first and second exemplary embodiments are not described redundantly, and mainly differences will be described. Respective configurations described in the first and second exemplary embodiments are also applicable to the light guide member and the multi display apparatus according to the third embodiment.

Figure 10:
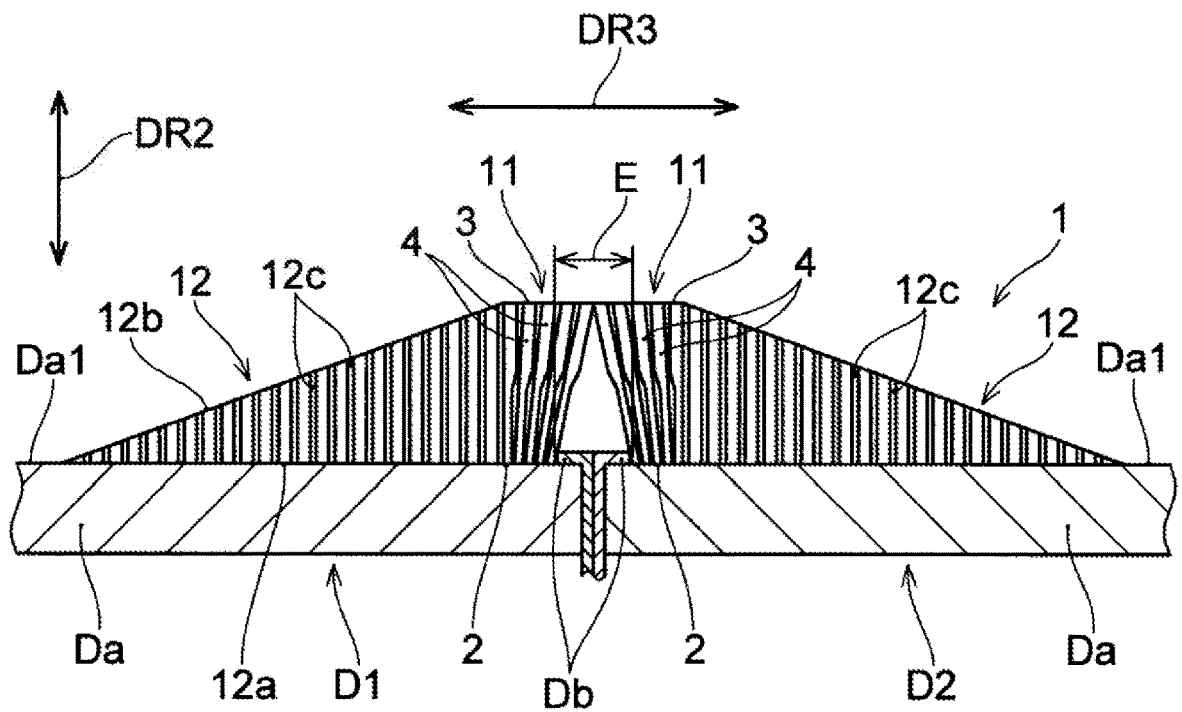
FIG. 10 is a cross-sectional view schematically illustrating another exemplary embodiment of the present invention, in which auxiliary parts are further provided.

In the present exemplary embodiment, in addition to the light guide member (light guide member body 11) according to the first or second exemplary embodiment, an auxiliary part 12 described below is provided. Specifically, as illustrated in FIG. 10, the light guide member 1 has the light guide member body 11 and the auxiliary part 12. The light guide member body 11 includes the light receiving surface 2, the light emitting surface 3 having the extension part E, and the plurality of optical fibers 4 configured such that the dimension in the width direction DR3 is greater on the light emitting surface 3 that on the light receiving surface 2. The auxiliary part 12 is provided opposite to the extension part E in the width direction DR3 with respect to the light guide member body 11.

As illustrated in FIG. 10, the auxiliary part 12 includes an auxiliary light receiving surface 12a extending on the same plane as the light receiving surface 2 of the light guide member body 11 and receiving light emitted from the display surface Da1 of the display panel Da, and an auxiliary light emitting surface 12b inclined such that the height from the auxiliary light receiving surface 12a in the separation direction DR2 becomes smaller as the distance in the width direction DR3 from the light guide member body 11 increases.

Figure 11:
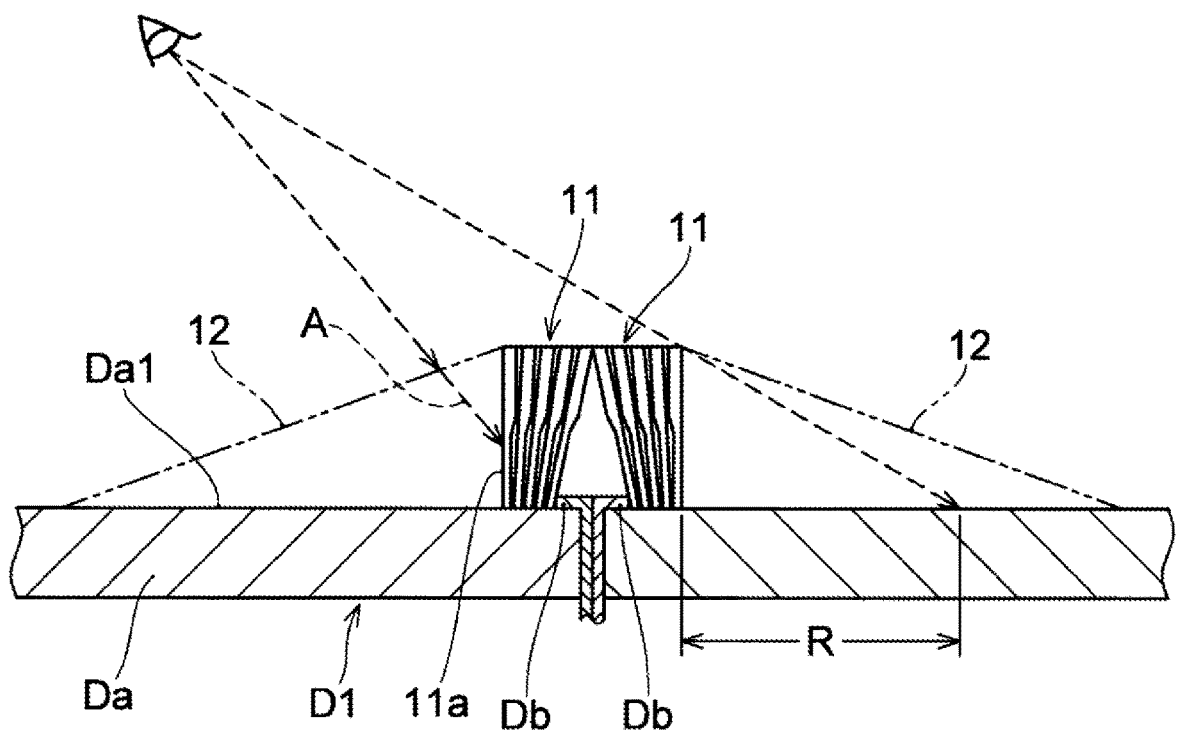
FIG. 11 is a diagram illustrating a state of the light guide member of the multi display apparatus viewed obliquely when there is no auxiliary part.

As a result, even when the multi display apparatus M is viewed from various angles, a continuous image can be displayed in the boundary region BR of the display devices D. Specifically, as illustrated in FIG. 11, when the multi display apparatus M is viewed from an inclined position rather than the front position, if there is no auxiliary part 12, although the joint caused by the frame Db is not viewed depending on the viewing angle, a side surface 11a of the light guide member body 11 may be seen (see arrow A in FIG. 11) or a blind area (see region R in FIG. 11) may be caused by the light guide member body 11 and accordingly the continuity of the image may be lost. In the present exemplary embodiment, since the auxiliary part 12 is provided, even if the multi display apparatus M is viewed from various angles other than the front, the loss of the image continuity on the multi display apparatus M is suppressed by the auxiliary light emitting surface 12b. Accordingly, the display quality of the multi display apparatus M can be improved.

In the present exemplary embodiment, the auxiliary part 12 has a plurality of optical fibers 12c each extending in the separation direction DR2 from the auxiliary light receiving surface 12a toward the auxiliary light emitting surface 12b. The optical fibers 12c provided in the auxiliary part 12 are similar to those in the light guide member body 11 in that a predetermined number of optical fibers are provided in the longitudinal direction DR1 and the width direction DR3. The optical fibers 12c extend perpendicularly to the auxiliary light receiving surface 12a, and at the inclined auxiliary light emitting surface 12b display the image displayed on the display surface Da1 of the display panel Da. The auxiliary part 12 may include, instead of the optical fibers 12c, other means for transmitting light from the auxiliary light receiving surface 12a to the auxiliary light emitting surface 12b.

The auxiliary part 12 may be formed integrally with the light guide member body 11, or may be connected, as an independent member, to the light guide member body 11 by an adhesive or the like. Alternatively, instead of joining the light guide member body 11 and the auxiliary part 12, the light guide member body 11 may be simply connected to the display panel Da and auxiliary part 12 may be simply connected to the display panel Da, so that the light guide member body 11 and the auxiliary part 12 may be arranged adjacent to each other. The angle between the auxiliary light receiving surface 12a and the auxiliary light emitting surface 12b is not particularly limited. For example, the angle between the auxiliary light receiving surface 12a and the auxiliary light emitting surface 12b is equal to or less than 60 degrees, preferably not less than 10 degrees and not greater than 45 degrees, more preferably not less than 10 degrees and not greater than 20 degrees.

Fourth Embodiment

Next, a light guide member and a multi display apparatus according to a fourth embodiment will be described. In the following description, features common to respective configurations of the first to third exemplary embodiments are not described redundantly, and mainly differences will be described. Respective configurations described in the first to third exemplary embodiments are also applicable to the light guide member and the multi display apparatus according to the fourth embodiment.

Figure 12:
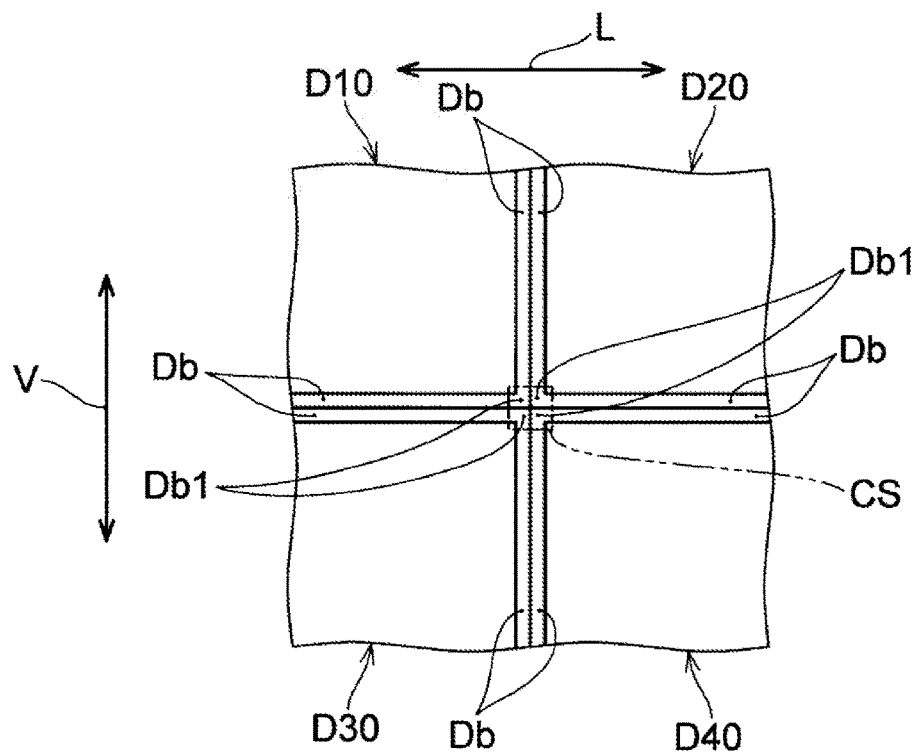
FIG. 12 is a diagram illustrating an intersection region of four display devices before the light guide members are attached.

The present exemplary embodiment intends to make the frame Db inconspicuous in the multi display apparatus M including at least four display devices D that are adjacent in the horizontal direction L and the vertical direction V. In the present exemplary embodiment, the multi display apparatus M includes a first display device D10, a second display device D20 adjacent to the first display device D10 in the horizontal direction L, a third display device D30 adjacent to the first display device D10 in the vertical direction V, and a fourth display devices D40 adjacent to the third display device D30 in the horizontal direction L and also adjacent to the second display device D20 in the vertical direction V. In this case, as illustrated in FIG. 12, there is an intersection region CS where the frames Db extending in the vertical direction V between the first display device D10 and the second display device D20 and also between the third display device D30 and the fourth display device D40 intersects the frames Db extending in the horizontal direction L between the first display device D10 and the third display device D30 and also between the second display device D20 and the fourth display device D40. This intersection region CS cannot be eliminated by only extending the light guide member in both the vertical direction V and the horizontal direction L along the frame Db.

Figure 13:
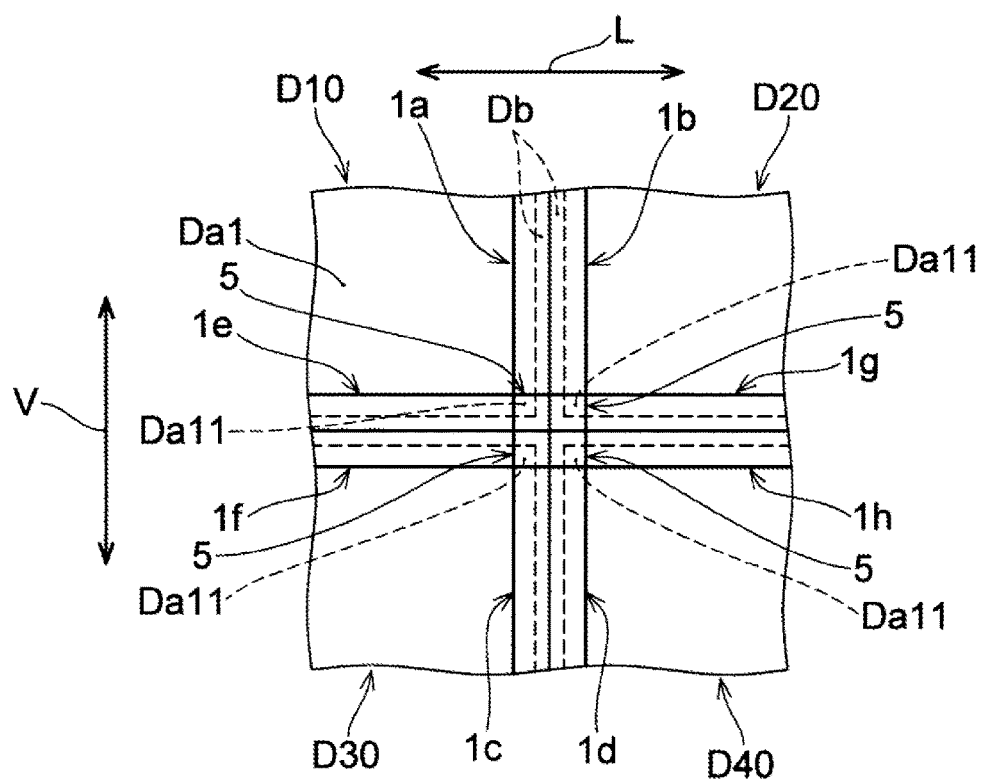
FIG. 13 is a diagram illustrating the intersection region in a state where the light guide members and corner light guide members are attached.

In the present exemplary embodiment, in order to eliminate the joint at the corner portion of the frames Db even in the intersection region CS, in addition to the light guide member 1 extending in each of the vertical direction V and the horizontal direction L, as illustrated in FIG. 13, a corner light guide member 5 is further arranged at a corner portion Db1 of the frames Db.

Figure 14:
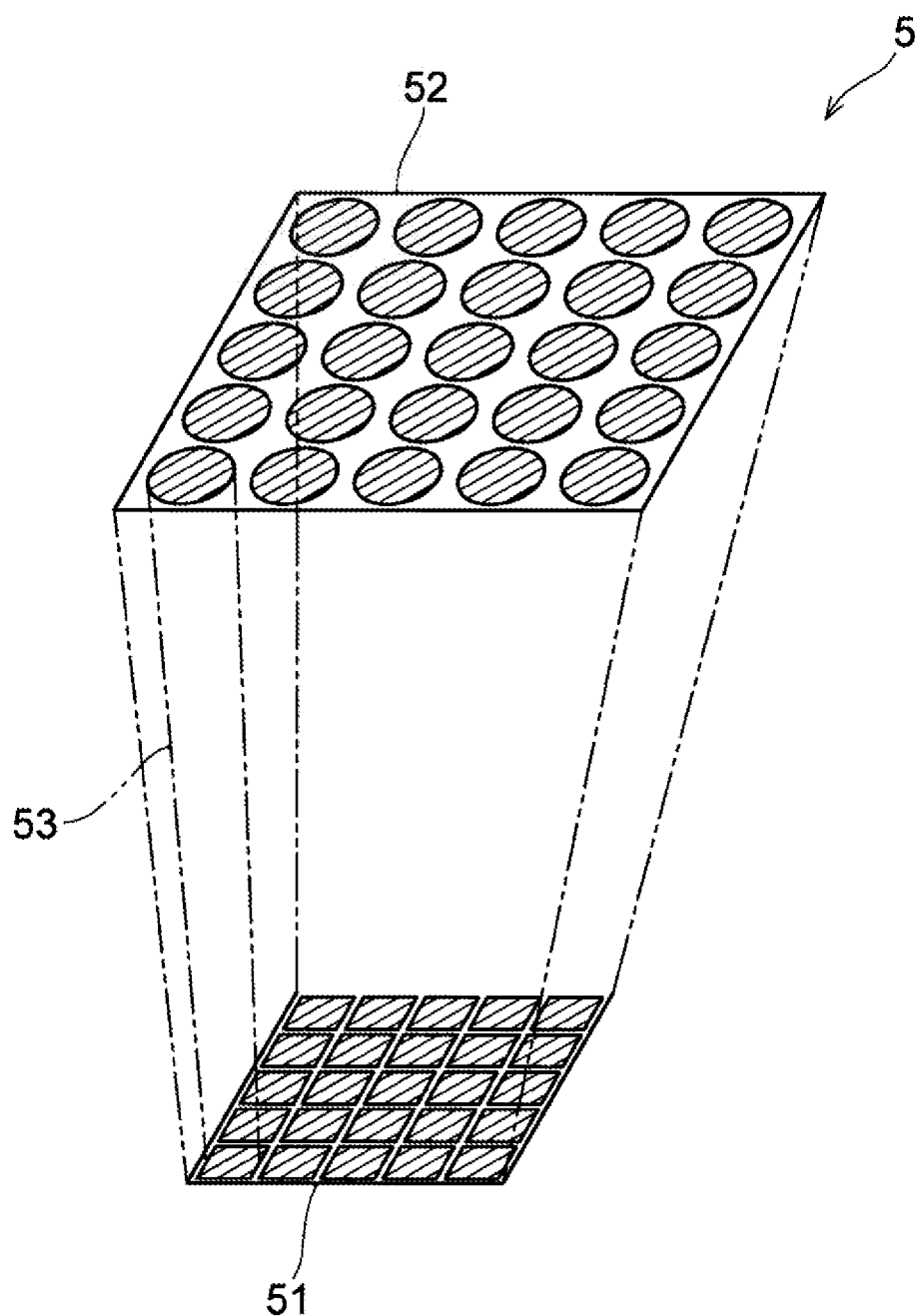
FIG. 14 is a perspective view schematically illustrating the corner light guide member.

As illustrated in FIG. 14, the corner light guide member 5 includes a corner light receiving surface 51 and a corner light emitting surface 52. The corner light receiving surface 51 is faced with a corner portion Da11 of the display surface Da1 of the display panel Da along the corner portion Db1 of the frame Db and receives light emitted from the display surface Da1 of the display panel Da. The corner light emitting surface 52 is separated from the corner light receiving surface 51 in a direction perpendicular to the corner light receiving surface 51 and emits the light entered from the corner light receiving surface 51 into the corner light guide member 5. The corner light guide member 5 has a plurality of optical fibers 53 that extends from the corner light receiving surface 51 toward the corner light emitting surface 52.

Figure 15:
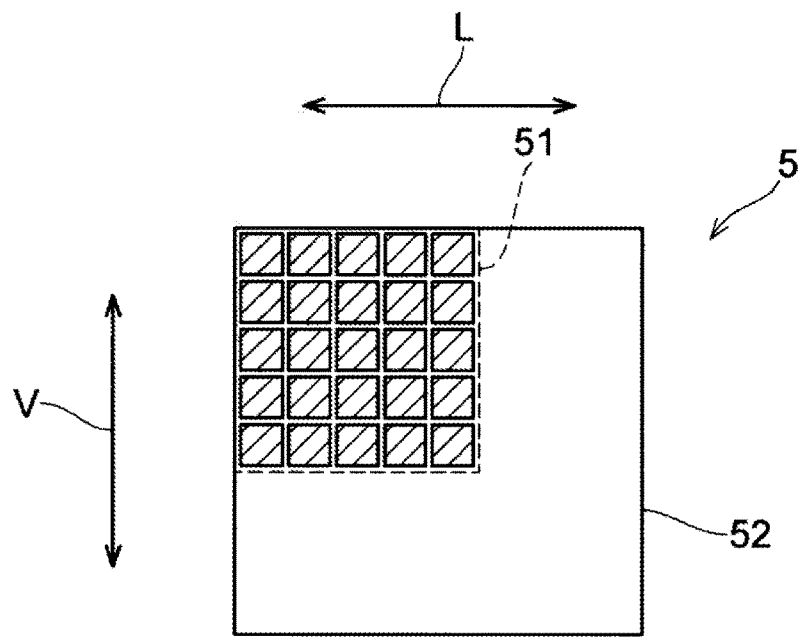
FIG. 15 is a diagram illustrating optical fiber ends on a cornier light receiving surface of the corner light guide member.
Figure 16:
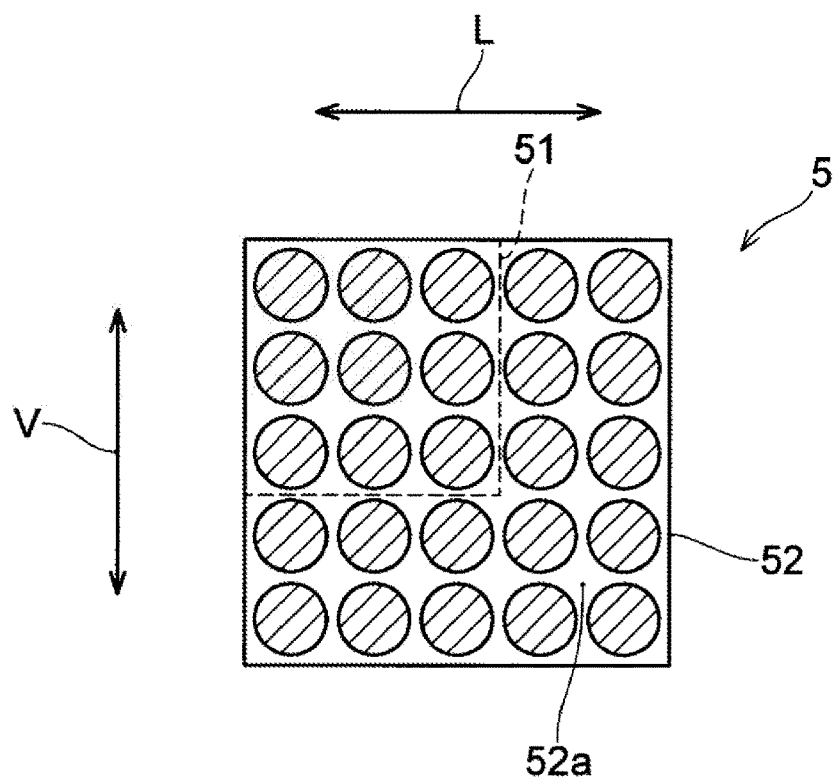
FIG. 16 is a diagram illustrating optical fiber ends on a corner light emitting surface of the corner light guide member.

As illustrated in FIGS. 15 and 16, the corner light emitting surface 52 has a corner extension part 52a covering the corner portion Db1 of the frame Db at least partly, and extending in the vertical direction V and the horizontal direction L with respect to the corner light receiving surface 51. In the present exemplary embodiment, the corner light guide member 5 is formed in a substantially truncated quadrangular pyramid shape. The corner light receiving surface 51 is substantially rectangular as illustrated in FIGS. 14 and 15, and the corner light emitting surface 52 is also substantially rectangular as illustrated in FIGS. 14 and 16. The corner light receiving surface 51 is configured to receive light emitted from the corner portion Da11 of the display surface Da1. Further, the corner light emitting surface 52 has a substantially rectangular shape whose size can cover the corner portion Da11 of the display surface Da1 that faces the corner light receiving surface 51 and the corner portion Db1 of the frame Db positionally corresponding to the corner portion Da11 of the display surface Da1. The corner extension part 52a is an L-shaped portion of the corner light emitting surface 52, except for a portion corresponding to the corner light receiving surface 51.

At least a part of the plurality of optical fibers 4 constituting the corner light guide member 5 is configured that the dimensions of the optical fibers 4 in the vertical direction V and the horizontal direction L are greater on the corner light emitting surface 52 than on the corner light receiving surface 51. Thus, the image displayed on the corner light emitting surface 52 can be enlarged in the vertical direction V and the horizontal direction L compared to the image displayed on the display surface Da1 that faces the corner light receiving surface 51. As a result, the image can be enlarged in the vertical direction V and the horizontal direction L and, even in the intersection region CS, the image is free from the joint generated due to the presence of the corner portion Db1 of the frame Db. Accordingly, a seamless image can be displayed in the intersection region CS of the multi display apparatus M.

In the present exemplary embodiment, as illustrated in FIG. 13, a first light guide member 1a and a second light guide member 1b each extending in the vertical direction V are provided in the boundary region BR between the first display device D10 and the second display device D20. A third light guide member 1c and a fourth light guide member 1d each extending in the vertical direction V are provided in the boundary region BR between the third display device D30 and a fourth display device D40. A fifth light guide member 1e and a sixth light guide member 1f each extending in the horizontal direction L are provided in the boundary region BR between the first display device D10 and the third display device D30. A seventh light guide member 1g and an eighth light guide member 1h each extending in the horizontal direction L are provided in the boundary region BR between the second display device D20 and the fourth display device D40. As illustrated in FIG. 13, the first to eighth light guide members 1a to 1h have the length not covering the corner portion Da11 of the display surface Da1 in the length so that the substantially rectangular display surface Da1 can be secured at the corner portion Db1 of the frame Db.

As illustrated in FIG. 13, in the present exemplary embodiment, the corner light guide member 5 is attached in such a manner that the corner light receiving surfaces 51 of four corner light guide members 5 contact four corners Da11 of four display surfaces Da1 in the intersection region CS. As a result, images can be enlarged in the vertical direction V and the horizontal direction L and displayed on the corner light emitting surfaces 52 of four corner light guide members 5. Accordingly, the first to eighth light guide members 1a to 1h can eliminate joints generated in the vertical direction V and the horizontal direction L and can also eliminate the joints at the corner portions Db1 of the frames Db. Accordingly, the display quality can be improved in the multi display M having a matrix arrangement.

CONCLUSION (1) The light guide member according to an exemplary embodiment of the present invention is a light guide member to be attached to a multi display apparatus in which at least two display devices having a display panel and a frame provided on an outer periphery of the display panel are arranged adjacent to each other, wherein the light guide member has an elongated body extending along the frame, in a boundary region where the at least two display devices are neighboring, the light guide member includes a light receiving surface to be faced with a peripheral portion of a display surface of the display panel along the frame, the light receiving surface receiving light emitted from the display surface of the display panel, a light emitting surface separated from the light receiving surface in a direction perpendicular to the light receiving surface, the light emitting surface emitting the light entered from the light receiving surface into the light guide member, and a plurality of optical fibers extending from the light receiving surface to the light emitting surface, the light emitting surface has an extension part for covering the frame at least partly, the extension part extending toward the frame, with respect to the light receiving surface, in a width direction perpendicular to a longitudinal direction of the light guide member and perpendicular to a separation direction in which the light receiving surface and the light emitting surface are separated, and at least a part of the plurality of optical fibers is configured that the dimension of each optical fiber in the width direction is greater on the light emitting surface than on the light receiving surface, so that an image displayed on the light emitting surface is enlarged in the width direction compared to an image displayed on the display surface facing the light receiving surface.

(2) In the light guide member according to the above-mentioned aspect (1), each of the at least the part of the plurality of optical fibers is configured that a cross-sectional area increases from the light receiving surface toward the light emitting surface in at least a part of the region from the light receiving surface toward the light emitting surface, and each of the at least the part of the plurality of optical fibers is inclined or curved with respect to the separation direction.

(3) In the light guide member according to the above-mentioned aspect (2), the at least the part of the plurality of optical fibers is formed in such a manner that the cross section is substantially rectangular at a position separated from the light receiving surface by a first distance and is substantially circular at a position separated from the light receiving surface by a second distance larger than the first distance.

(4) In the light guide member according to any one of the above-mentioned aspects (1) to (3), the light guide member is configured to be attached, in the boundary region, in such a way as to straddle the frames of two neighboring display devices, the light receiving surface has a first light receiving surface and a second light receiving surface that are separated in the width direction, a recess having a width sufficient for accommodating frames of the two display devices arranged adjacent to each other is formed between the first light receiving surface and the second light receiving surface, and light entered from the first light receiving surface and the second light receiving surface is emitted from a single light emitting surface via the plurality of optical fibers.

(5) In the light guide member according to any one of the above-mentioned aspects (1) to (4), the light guide member includes a light guide member body including the light receiving surface, the light emitting surface having the extension part, and the plurality of optical fibers configured such that the dimension in the width direction is greater on the light emitting surface than on the light receiving surface, and an auxiliary part provided opposite to the extension part in the width direction with respect to the light guide member body, the auxiliary part includes an auxiliary light receiving surface extending on the same plane as the light receiving surface of the light guide member body and receiving light emitted from the display surface of the display panel, and an auxiliary light emitting surface inclined such that the height from the auxiliary light receiving surface in the separation direction becomes smaller as the distance in the width direction from the light guide member body increases.

(6) In the light guide member according to the above-mentioned aspect (5), the auxiliary part includes a plurality of optical fibers extending in the separation direction from the auxiliary light receiving surface toward the auxiliary light emitting surface.

(7) The multi display apparatus according to an exemplary embodiment of the present invention is a multi display apparatus having at least two display devices having a display panel and a frame provided on an outer periphery of the display panel and arranged adjacent to each other, and a light guide member having an elongated body extending along the frame and attached to a display surface of the display panel in a boundary region where the at least two display devices are neighboring, wherein the light guide member includes a light receiving surface to be faced with a peripheral portion of the display surface of the display panel along the frame, the light receiving surface receiving light emitted from the display surface of the display panel, a light emitting surface separated from the light receiving surface in a direction perpendicular to the light receiving surface, the light emitting surface emitting the light entered from the light receiving surface into the light guide member, and a plurality of optical fibers extending from the light receiving surface to the light emitting surface, wherein the light emitting surface has an extension part for covering the frame at least partly, the extension part extending toward the frame, with respect to the light receiving surface, in a width direction perpendicular to a longitudinal direction of the light guide member and perpendicular to a separation direction in which the light receiving surface and the light emitting surface are separated, and at least a part of the plurality of optical fibers is configured that the dimension of each optical fiber in the width direction is greater on the light emitting surface than on the light receiving surface, so that an image displayed on the light emitting surface is enlarged in the width direction compared to an image displayed on the display surface facing the light receiving surface.

(8) In the multi display apparatus according to the above-mentioned aspect (7), each of the at least the part of the plurality of optical fibers is configured that a cross-sectional area increases from the light receiving surface toward the light emitting surface in at least a part of region from the light receiving surface toward the light emitting surface, and each of the at least the part of the plurality of optical fibers is inclined or curved with respect to the separation direction.

(9) In multi display apparatus according to the above-mentioned aspect (7) or (8), the at least the part of the plurality of optical fibers is formed in such a manner at the cross section is substantially rectangular at a position separated from the light receiving surface by a first distance and is substantially circular at a position separated from the light receiving surface by a second distance larger than the first distance.

(10) In the multi display apparatus according to any one of the above-mentioned aspects (7) to (9), the light guide member is configured to be attached, in the boundary region, in such a way as to straddle the frames of two neighboring display devices, the light receiving surface has a first light receiving surface and a second light receiving surface that are separated in the width direction, a recess having a width sufficient for accommodating frames of the two display devices arranged adjacent to each other is formed between the first light receiving surface and the second light receiving surface, and light entered from the first light receiving surface and the second light receiving surface is emitted from a single light emitting surface via the plurality of optical fibers.

(11) In the multi display apparatus according to any one of the above-mentioned aspects (7) to (10), the light guide member incudes a light guide member body including the light receiving surface, the light emitting surface having the extension part, and the plurality of optical fibers configured such that the dimension in the width direction is greater on the light emitting surface than on the light receiving surface, and an auxiliary part provided opposite to the extension part in the width direction with respect to the light guide member body, the auxiliary part includes an auxiliary light receiving surface extending on the same plane as the light receiving surface of the light guide member body and receiving light emitted from the display surface of the display panel, and an auxiliary light emitting surface inclined such that the height from the auxiliary light receiving surface in the separation direction becomes smaller as the distance in the width direction from the light guide member body increases.

(12) In the multi display apparatus according to the above-mentioned aspect (11), the auxiliary part has a plurality of optical fibers extending in the separation direction from the auxiliary light receiving surface toward the auxiliary light emitting surface.

(13) In the multi display apparatus according to any one of the above-mentioned aspects (7) to (12), the light guide member includes a first light guide member attached along a frame of a first display device of the at least two display devices in the boundary region, and a second light guide member attached along a frame of a second display device neighboring the first display device in the boundary region, the first light guide member has a first light receiving surface being faced with the peripheral portion of the display surface of a display panel of the first display device along the frame of the first display device, a first light emitting surface separated from the first light receiving surface in a direction perpendicular to the first light receiving surface, the first light emitting surface emitting the light entered from the first light receiving surface into the first light guide member, and a plurality of first optical fibers extending from the first light receiving surface to the first light emitting surface, the first light emitting surface has a first extension part for covering the frame of the first display device at least partly, the extension part extending toward the frame of the first display device, with respect to the first light receiving surface, in the width direction, and at least a part of the plurality of first optical fibers is configured that the dimension of each optical fiber in the width direction is greater on the first light emitting surface than on the first light receiving surface, the second light guide member has a second light receiving surface being faced with the peripheral portion of the display surface of a display panel of the second display device along the frame of the second display device, a second light emitting surface separated from the second light receiving surface in a direction perpendicular to the second light receiving surface, the second light emitting surface emitting the light entered from the second light receiving surface into the second light guide member, and a plurality of second optical fibers extending from the second light receiving surface to the second light emitting surface, the second light emitting surface has a second extension part for covering the frame of the second display device at least partly, the extension part extending toward the frame of the second display device, with respect to the second light receiving surface, in the width direction, and at least a part of the plurality of second optical fibers is configured that the dimension of each optical fiber in the width direction is greater on the second light emitting surface than on the second light receiving surface.

(14) In the multi display apparatus according to any one of the above-mentioned aspects (7) to (13), the at least two display devices include a first display device, a second display device adjacent to the first display device in a horizontal direction, a third display device adjacent to the first display device in a vertical direction, and a fourth display device adjacent to the third display device in the horizontal direction and adjacent to the second display device in the vertical direction, and the multi display apparatus further includes a corner light guide member in an intersection region where frames extending in the vertical direction between the first display device and the second display device and between the third display device and the fourth display device intersect frames extending in the horizontal direction between the first display device and the third display device and between the second display device and the fourth display device, the cornier light guide member includes a corner light receiving surface to be faced with a corner portion of the display surface of the display panel along a cornier portion of the frame, the corner light receiving surface receiving light emitted from the display surface of the display panel, a corner light emitting surface separated from the corner light receiving surface in a direction perpendicular to the corner light receiving surface, the corner light emitting surface emitting the light entered from the corner light receiving surface into the corner light guide member, and a plurality of optical fibers extending from the corner light receiving surface to the corner light emitting surface, the corner light emitting surface has a corner extension part for covering the corner portion of the frame at least partly, the corner extension part extending in the vertical direction and the horizontal direction, with respect to the corner light receiving surface, and at least a part of the plurality of optical fibers of the cornier light guide member is configured that the dimension of each optical fiber in the vertical direction and the horizontal direction is greater on the corner light emitting surface than on the corner light receiving surface, so that an image displayed on the corner light emitting surface is enlarged in the vertical direction and the horizontal direction compared to an image displayed on the display surface facing the corner light receiving surface.

What is claimed is:

1. Alight guide member comprising:
   a light receiving surface configured to receive light emitted from a display surface of a display panel of a plurality of display devices arranged adjacent to one another;
   a light emitting surface separated from the light receiving surface in a height direction perpendicular to the light receiving surface, the light emitting surface configured to emit light received by the light receiving surface;
   a plurality of optical fibers extending from the light receiving surface to the light emitting surface; and
   an extension part extending in a width direction perpendicular to both the height direction and a longitudinal direction of the light guide member,
   wherein a dimension in the width direction of at least one part of the plurality of optical fibers is greater on the light emitting surface than on the light receiving surface, so that an image emitted by the light emitting surface is enlarged in the width direction compared to an image received by the light receiving surface from the display surface, and
   wherein the at least one part of the plurality of optical fibers is formed in such a manner that a cross section is substantially rectangular at a position separated from the light receiving surface by a first distance and is substantially circular at a position separated from the light receiving surface by a second distance larger than the first distance.

2. The light guide member according to claim 1, wherein each of the at least one part of the plurality of optical fibers is configured such that a cross-sectional area increases from the light receiving surface toward the light emitting surface in at least one part of a boundary region from the light receiving surface toward the light emitting surface, and each of the at least one part of the plurality of optical fibers is inclined or curved with respect to the height direction.

3. The light guide member according to claim 1, wherein the light guide member is configured to be attached, in a boundary region, in such a way as to straddle frames of two neighboring display devices,
   the light receiving surface has a first light receiving surface and a second light receiving surface that are separated in the width direction, a recess having a width sufficient for accommodating frames of the two display devices arranged adjacent to each other is formed between the first light receiving surface and the second light receiving surface, and light entering from the first light receiving surface and the second light receiving surface is emitted from a single light emitting surface via the plurality of optical fibers.

4. The light guide member according to claim 1, further comprising:

a light guide member body including the light receiving surface, the light emitting surface having the extension part, and a dimension in the width direction of the plurality of optical fibers is greater on the light emitting surface than on the light receiving surface, and an auxiliary part provided opposite to the extension part in the width direction with respect to the light guide member body, the auxiliary part includes an auxiliary light receiving surface extending on a same plane as the light receiving surface of the light guide member body and receiving light emitted from the display surface of the display panel, and an auxiliary light emitting surface inclined such that a height from the auxiliary light receiving surface in the height direction becomes smaller as a distance in the width direction from the light guide member body increases.

5. The light guide member according to claim 4, wherein the auxiliary part includes a plurality of optical fibers extending in the height direction from the auxiliary light receiving surface toward the auxiliary light emitting surface.

6. A multi display apparatus having at least two display devices having a display panel and a frame provided on an outer periphery of the display panel and arranged adjacent to each other, and a light guide member extending along the frame and attached to a display surface of the display panel only in a boundary region where the at least two display devices are neighboring, wherein the light guide member includes:

a light receiving surface facing a peripheral portion of the display surface of the display panel along the frame, the light receiving surface receiving light emitted from the display surface of the display panel;

a light emitting surface separated from the light receiving surface in a height direction perpendicular to the light receiving surface, the light emitting surface configured to emit light received by the light receiving surface;

a plurality of optical fibers extending from the light receiving surface to the light emitting surface; and an extension part extending in a width direction perpendicular to both the height direction and a longitudinal direction of the light guide member, wherein a dimension in the width direction of at least one part of the plurality of optical fibers is greater on the light emitting surface than on the light receiving surface, so that an image emitted by the light emitting surface is enlarged in the width direction compared to an image received by the light receiving surface from the display surface, and wherein the at least one part of the plurality of optical fibers is formed in such a manner that a cross section is substantially rectangular at a position separated from the light receiving surface by a first distance and is substantially circular at a position separated from the light receiving surface by a second distance larger than the first distance.

7. The multi display apparatus according to claim 6, wherein each of the at least one part of the plurality of optical fibers is configured that a cross-sectional area increases from the light receiving surface toward the light emitting surface in at least one part of the region from the light receiving surface toward the light emitting surface, and each of the at least one part of the plurality of optical fibers is inclined or curved with respect to the height direction.

8. The multi display apparatus according to claim 6, wherein the light guide member is configured to be attached, in the boundary region, in such a way as to straddle frames of two neighboring display devices, the light receiving surface has a first light receiving surface and a second light receiving surface that are separated in the width direction, a recess having a width sufficient for accommodating frames of the two display devices arranged adjacent to each other is formed between the first light receiving surface and the second light receiving surface, and light entering from the first light receiving surface and the second light receiving surface is emitted from a single light emitting surface via the plurality of optical fibers.

9. The multi display apparatus according to claim 6, wherein the light guide member further includes a first light guide member attached along a frame of a first display device of the at least two display devices in the boundary region, and a second light guide member attached along a frame of a second display device of the at least two display devices neighboring the first display device in the boundary region, the first light guide member has a first light receiving surface facing the peripheral portion of the display surface of a display panel of the first display device along the frame of the first display device, a first light emitting surface separated from the first light receiving surface in the height direction, the first light emitting surface emitting the light entering from the first light receiving surface into the first light guide member, and a plurality of first optical fibers extending from the first light receiving surface to the first light emitting surface, the first light emitting surface has a first extension part covering the frame of the first display device at least partly, the extension part extending toward the frame of the first display device, with respect to the first light receiving surface, in the width direction, and at least one part of the plurality of first optical fibers is configured such that a dimension of each optical fiber in the width direction is greater on the first light emitting surface than on the first light receiving surface, the second light guide member has a second light receiving surface facing the peripheral portion of the display surface of a display panel of the second display device along the frame of the second display device, a second light emitting surface separated from the second light receiving surface in the height direction, the second light emitting surface emitting the light entering from the second light receiving surface into the second light guide member, and a plurality of second optical fibers extending from the second light receiving surface to the second light emitting surface, the second light emitting surface has a second extension part covering the frame of the second display device at least partly, the extension part extending toward the frame of the second display device, with respect to the second light receiving surface, in the width direction, and at least one part of the plurality of second optical fibers is configured such that a dimension of each optical fiber in the width direction is greater on the second light emitting surface than on the second light receiving surface.

10. The multi display apparatus according to claim 6, wherein the at least two display devices further include a first display device, a second display device adjacent to the first display device in the width direction, a third display device adjacent to the first display device in the longitudinal direction, and a fourth display device adjacent to the third display device in the width direction and adjacent to the second display device in the longitudinal direction, and the multi display apparatus further includes a corner light guide member in an intersection region where frames extending in the longitudinal direction between the first display device and the second display device and between the third display device and the fourth display device intersect frames extending in the width direction between the first display device and the third display device and between the second display device and the fourth display device, the corner light guide member includes a corner light receiving surface facing a corner portion of the display surface of the display panel along a corner portion of the frame, the corner light receiving surface receiving light emitted from the display surface of the display panel, a corner light emitting surface separated from the corner light receiving surface in the height direction, the corner light emitting surface emitting the light entering from the corner light receiving surface into the corner light guide member, and a plurality of optical fibers extending from the corner light receiving surface to the corner light emitting surface, the corner light emitting surface has a corner extension part covering the corner portion of the frame at least partly, the corner extension part extending in the longitudinal direction and the width direction, with respect to the corner light receiving surface, and at least one part of the plurality of optical fibers of the corner light guide member is configured that a dimension of each optical fiber in the longitudinal direction and the width direction is greater on the corner light emitting surface than on the corner light receiving surface, so that an image emitted by the corner light emitting surface is enlarged in the longitudinal direction and the width direction compared to an image received by the corner light receiving surface from the display surface.

11. The multi display apparatus according to claim 6, wherein the light guide member includes a light guide member body including the light receiving surface, the light emitting surface having the extension part, and a dimension in the width direction of the plurality of optical fibers is greater on the light emitting surface than on the light receiving surface, and an auxiliary part provided opposite to the extension part in the width direction with respect to the light guide member body, the auxiliary part includes an auxiliary light receiving surface extending on the same plane as the light receiving surface of the light guide member body and receiving light emitted from the display surface of the display panel, and an auxiliary light emitting surface inclined such that the height from the auxiliary light receiving surface in the height direction becomes smaller as the distance in the width direction from the light guide member body increases.

12. The multi display apparatus according to claim 11, wherein the auxiliary part has a plurality of optical fibers extending in the height direction from the auxiliary light receiving surface toward the auxiliary light emitting surface.

13. A light guide member comprising:

a light receiving surface configured to receive light emitted from a display surface of a display panel of a plurality of display devices arranged adjacent to one another;

a light emitting surface separated from the light receiving surface in a height direction perpendicular to the light receiving surface, the light emitting surface configured to emit light received by the light receiving surface;

a plurality of optical fibers extending from the light receiving surface to the light emitting surface; and an extension part extending in a width direction perpendicular to both the height direction and a longitudinal direction of the light guide member, wherein a dimension in the width direction of at least one part of the plurality of optical fibers is greater on the light emitting surface than on the light receiving surface, so that an image emitted by the light emitting surface is enlarged in the width direction compared to an image received by the light receiving surface from the display surface, the light guide member further comprises:

a light guide member body including the light receiving surface, the light emitting surface having the extension part, and a dimension in the width direction of the plurality of optical fibers is greater on the light emitting surface than on the light receiving surface; and an auxiliary part provided opposite to the extension part in the width direction with respect to the light guide member body, and the auxiliary part includes an auxiliary light receiving surface extending on a same plane as the light receiving surface of the light guide member body and receiving light emitted from the display surface of the display panel, and an auxiliary light emitting surface inclined such that a height from the auxiliary light receiving surface in the height direction becomes smaller as a distance in the width direction from the light guide member body increases.

* * * * *